US012132796B2

(12) United States Patent
Guo et al.

(10) Patent No.: US 12,132,796 B2
(45) Date of Patent: Oct. 29, 2024

(54) TRACKING SESSION EVENTS FOR A WEBPAGE IFRAME

(71) Applicant: Content Square SAS, Paris (FR)

(72) Inventors: Antoine Guo, Paris (FR); Gregory Riberon, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/201,972

(22) Filed: May 25, 2023

(65) Prior Publication Data
US 2023/0379394 A1    Nov. 23, 2023

Related U.S. Application Data

(63) Continuation of application No. 18/131,266, filed on Apr. 5, 2023.

(60) Provisional application No. 63/327,735, filed on Apr. 5, 2022.

(51) Int. Cl.
*H04L 67/50* (2022.01)
*H04L 67/146* (2022.01)

(52) U.S. Cl.
CPC .......... *H04L 67/535* (2022.05); *H04L 67/146* (2013.01)

(58) Field of Classification Search
CPC ............................ H04L 67/535; H04L 67/146
USPC ........................................................ 709/224
See application file for complete search history.

(56) References Cited

U.S. PATENT DOCUMENTS

| | | | | |
|---|---|---|---|---|
| 8,805,946 B1 * | 8/2014 | Glommen | ............. | H04L 67/306 709/227 |
| 9,344,494 B2 * | 5/2016 | Mordani | ................. | H04L 69/40 |
| 9,912,767 B1 * | 3/2018 | Weald | ................ | G06Q 30/0241 |
| 10,292,012 B1 * | 5/2019 | Yuan | ...................... | H04W 4/025 |
| 10,719,300 B2 * | 7/2020 | Shalev | .................. | G06F 21/128 |
| 10,795,961 B2 * | 10/2020 | Welch | ................. | G06F 16/9566 |

(Continued)

FOREIGN PATENT DOCUMENTS

WO    2023194923    10/2023

OTHER PUBLICATIONS

"International Application Serial No. PCT/IB2023/053461, International Search Report mailed Jun. 14, 2023", 3 pgs.

(Continued)

*Primary Examiner* — Tauqir Hussain
(74) *Attorney, Agent, or Firm* — Schwegman Lundberg & Woessner, P.A.

(57) ABSTRACT

Aspects of the present disclosure involve a system comprising a computer-readable storage medium storing a program and method for tracking session events for an iframe. The program and method provide for accessing session events corresponding to user interaction by plural first devices with respect to a webpage, the session events comprising first session events associated with a first tracking tag corresponding to a main window of the webpage, the session events further comprising second session events associated with a second tracking tag corresponding to an iframe of the webpage; determining, based on the first session events associated with the first tracking tag, first zoning information corresponding to the main window of the webpage; determining, based on the second session events associated with the second tracking tag, second zoning information corresponding to the iframe of the webpage; and causing, based on the first and second zoning information, display of zoning metrics on a second device.

20 Claims, 10 Drawing Sheets

(56) References Cited

U.S. PATENT DOCUMENTS

| | | | |
|---|---|---|---|
| 10,838,744 B2 * | 11/2020 | Berlitz | G06F 9/44584 |
| 10,953,328 B1 * | 3/2021 | Schuster | G06F 9/45558 |
| 10,990,641 B2 * | 4/2021 | Kirk | G06F 40/154 |
| 11,137,887 B1 * | 10/2021 | Garibaldi | G06F 16/9574 |
| 11,232,172 B2 * | 1/2022 | Mendes | G06F 16/23 |
| 11,277,658 B1 * | 3/2022 | Etwaru | G06F 16/7867 |
| 11,449,186 B2 * | 9/2022 | Shields | G06F 40/143 |
| 11,483,156 B1 * | 10/2022 | Etwaru | H04L 63/0807 |
| 11,605,020 B2 * | 3/2023 | Yin | G06F 40/103 |
| 11,698,464 B2 * | 7/2023 | Anderson | G01S 19/29 |
| | | | 342/357.69 |
| 2010/0153219 A1 * | 6/2010 | Mei | G06F 40/20 |
| | | | 707/E17.05 |
| 2014/0089782 A1 * | 3/2014 | Cook | G06F 16/957 |
| | | | 715/234 |
| 2016/0004781 A1 * | 1/2016 | Sturm | G06Q 30/0244 |
| | | | 715/201 |
| 2016/0269497 A1 * | 9/2016 | Glommen | H04L 67/306 |
| 2018/0027085 A1 * | 1/2018 | Stanislaw | H04L 67/535 |
| | | | 709/224 |
| 2018/0046602 A1 * | 2/2018 | Sisson | G06F 40/166 |
| 2020/0410514 A1 * | 12/2020 | Livhits | G06Q 30/0269 |
| 2021/0240909 A1 * | 8/2021 | Ghiaus | G06F 9/451 |
| 2021/0258394 A1 * | 8/2021 | Webber | H04L 67/61 |
| 2021/0263988 A1 * | 8/2021 | Maddern | H04L 67/14 |
| 2022/0101402 A1 * | 3/2022 | Colombier | G06Q 30/0643 |
| 2022/0174125 A1 * | 6/2022 | Glommen | H04L 67/306 |
| 2022/0222378 A1 * | 7/2022 | Johannsen | H04L 63/0281 |
| 2022/0256006 A1 * | 8/2022 | Johannsen | H04L 67/535 |
| 2023/0010362 A1 * | 1/2023 | Sylvia | H04N 21/252 |
| 2023/0319154 A1 | 10/2023 | Guo | |

OTHER PUBLICATIONS

"International Application Serial No. PCT/IB2023/053461, Written Opinion mailed Jun. 14, 2023", 5 pgs.

* cited by examiner

TRACKING SESSION EVENTS FOR A WEBPAGE IFRAME

CLAIM OF PRIORITY

This application is a continuation of U.S. application Ser. No. 18/131,266, filed Apr. 5, 2023, which claims the benefit of priority of U.S. Provisional Application Ser. No. 63/327,735, filed Apr. 5, 2022, each which is hereby incorporated by reference in its entirety.

TECHNICAL FIELD

The present disclosure relates generally to web session analysis, including tracking session events for an iframe within a webpage.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Web analysis solutions provide for the collection and analysis of website data. Example web analysis tools include the tracking and recording of session events corresponding to user interactions, automated website zone or element identification, session replay, statistical analysis of collected data, and the like. In some cases, a webpage of a web site includes an iframe, which is a Hypertext Markup Language (HTML) document embedded inside another HTML document.

The disclosed embodiments provide an experience analytics system configured to track session events corresponding to user interaction with respect to iframe(s) in a webpage. The experience analytics system provides for a parent-child relationship with respect to main window of a webpage and any iframe(s) within the webpage. The main window is assigned a parent tracking tag configured to collect session events for the main window. Each iframe is assigned a child tracking tag configured to collect session events for the respective frame, and to pass the collected session events to the parent tracking tag. The parent tracking tag is further configured to receive the session events collected from child tracking tag(s), and to batch all session events to a pipeline. The session events are serialized and stored in a database.

At a later stage, a user (e.g., member client) of the experience analytics system may request to perform zoning analysis with respect to the webpage. In response to such a request, the experience analytics system unserializes the stored session events for the webpage. In this regard, an iframe typically include an inner document within its HTML. Thus, the experience analytics system is configured to wait for iframe(s) to be loaded before unserializing HTML elements of the iframe as children. The inner document of the iframe may be replaced by the unserialized HTML elements.

Networked Computing Environment

Figure 1:
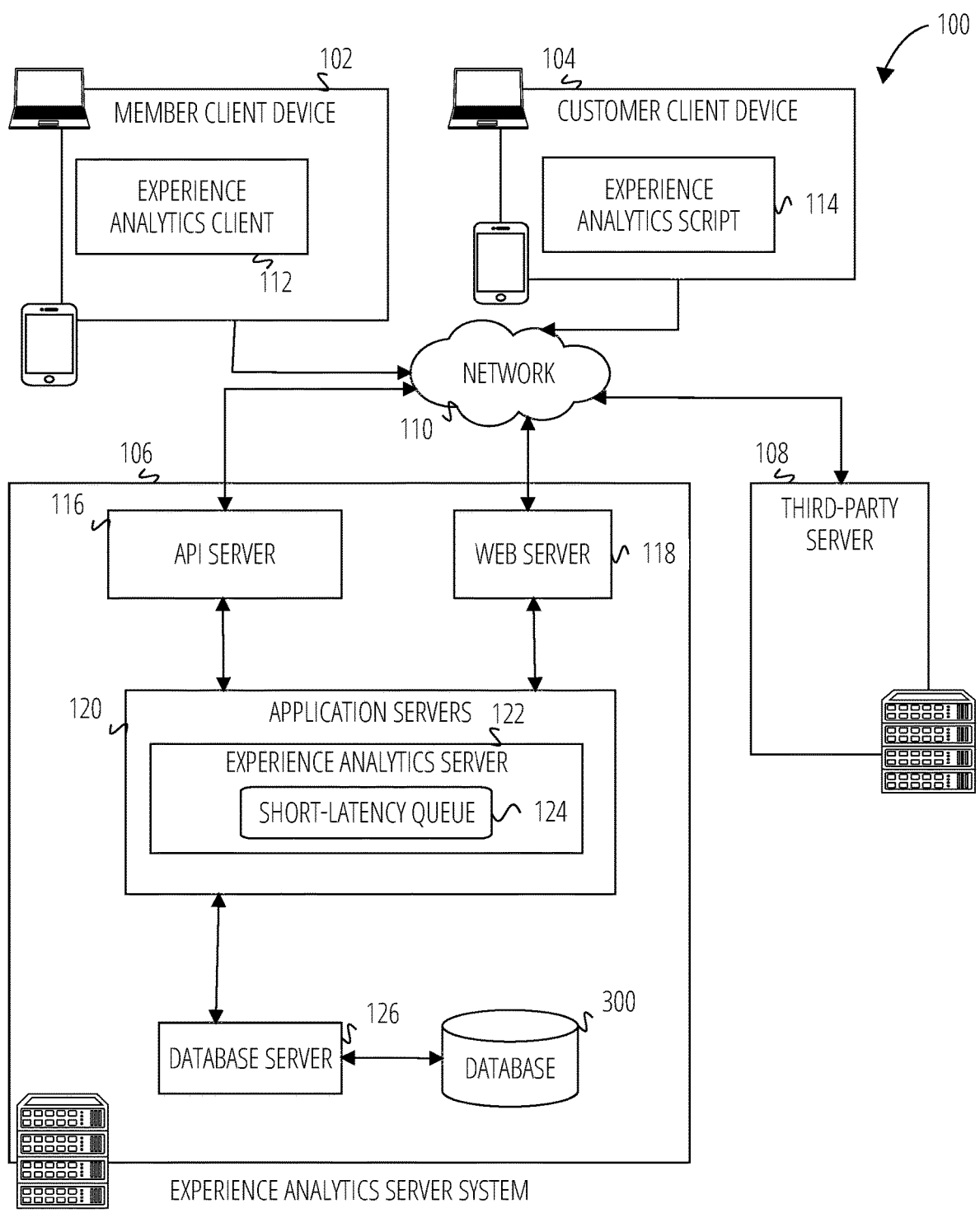
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.). The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the web site.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any combination thereof.

While a user of the customer client device 104 is navigating a client's website on an Internet browsing application, the Internet browsing application on the customer client device 104 can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a .json file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112. The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (API) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server 116 exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc.

The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script 114 on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including the users' interactions therewith.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the web site to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database 300 data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the web site visitor at the customer client device 104 pressed the chat button.

System Architecture

Figure 2:
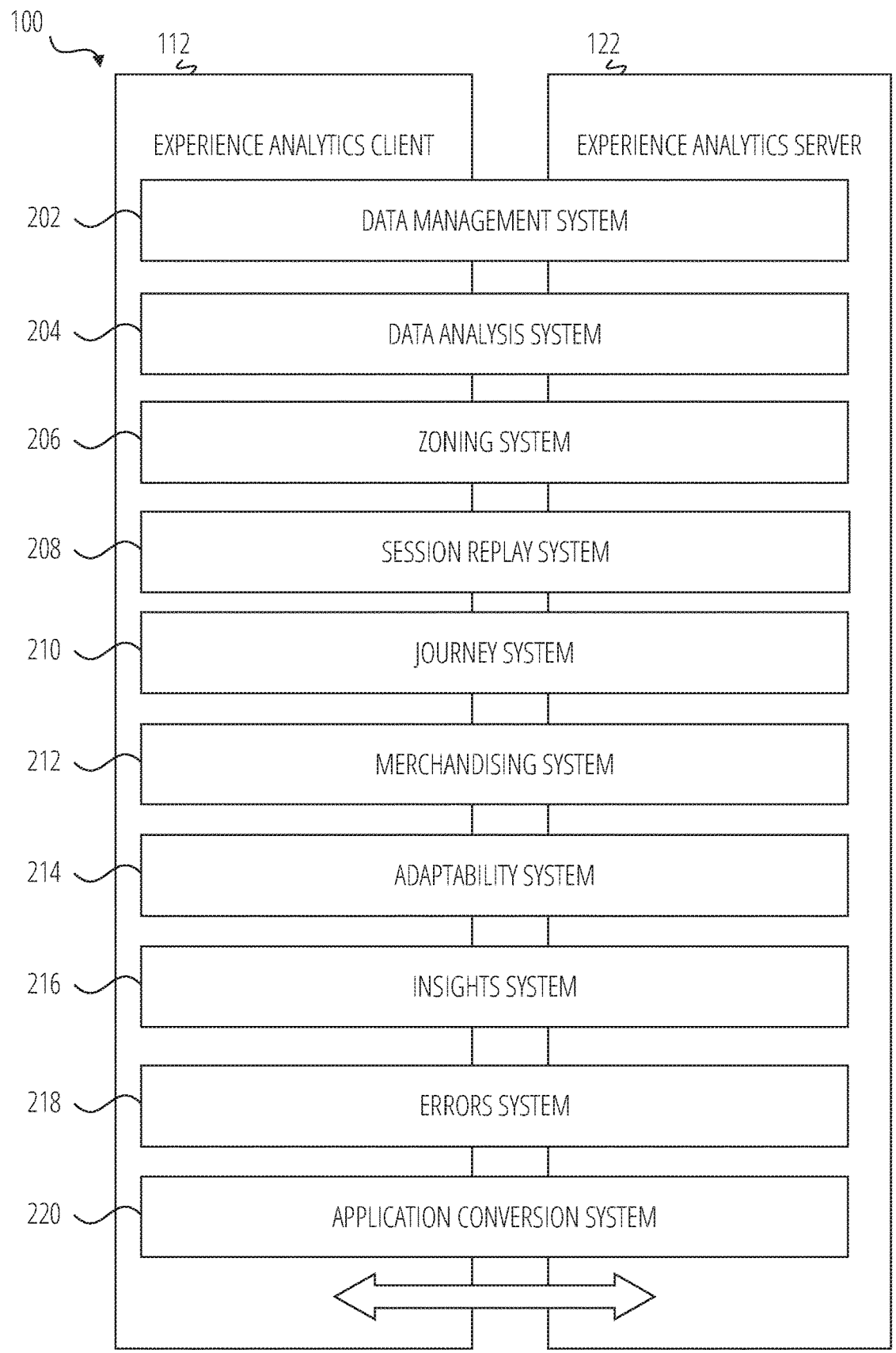
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the processors 1104, the experience analytics script 114 executed by each of the customer client devices 104, and the third-party servers 108. The data management system 202 is also responsible for exporting data to the processors 1104 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the processors 1104 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the processors 1104. In one example, the data can be generated using information from the data analysis system 204.

The session replay system 208 is responsible for generating the session replay interface to be displayed by the processors 1104 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's web site on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the processors 1104 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the processors 1104 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the web site, and illustrates the visited pages and in order in which the pages were visited. The client viewing the journey interface on the processors 1104 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the processors 1104 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's web site to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the processors 1104 via the experience analytics client 112 on a dashboard of a user interface, as a pop-up element, as a separate panel, etc. In this example, the insights system 216 is responsible for generating an insights interface to be displayed by the processors 1104 via the experience analytics client 112. In another example, the insights can be incorporated in another interface such as the zoning interface, the session replay, the journey interface, or the merchandising interface to be displayed by the processors 1104.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 104 visiting the client's website). The errors can also include causes of looping behaviors by the users, in-page issues such as unresponsive calls to action and slow loading pages, etc. The errors can be displayed by the processors 1104 via the experience analytics client 112 on a dashboard of a user interface, as a pop-up element, as a separate panel, etc. In this example, the errors system 218 is responsible for generating an errors interface to be displayed by the processors 1104 via the experience analytics client 112. In another example, the insights can be incorporated in another interface such as the zoning interface, the session replay, the journey interface, or the merchandising interface to be displayed by the processors 1104.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the processors 1104 via the experience analytics client 112. The application conversion system 220 generates an accessibility-enhanced version of the client's mobile application to be displayed by the customer client devices 104.

Data Architecture

Figure 3:
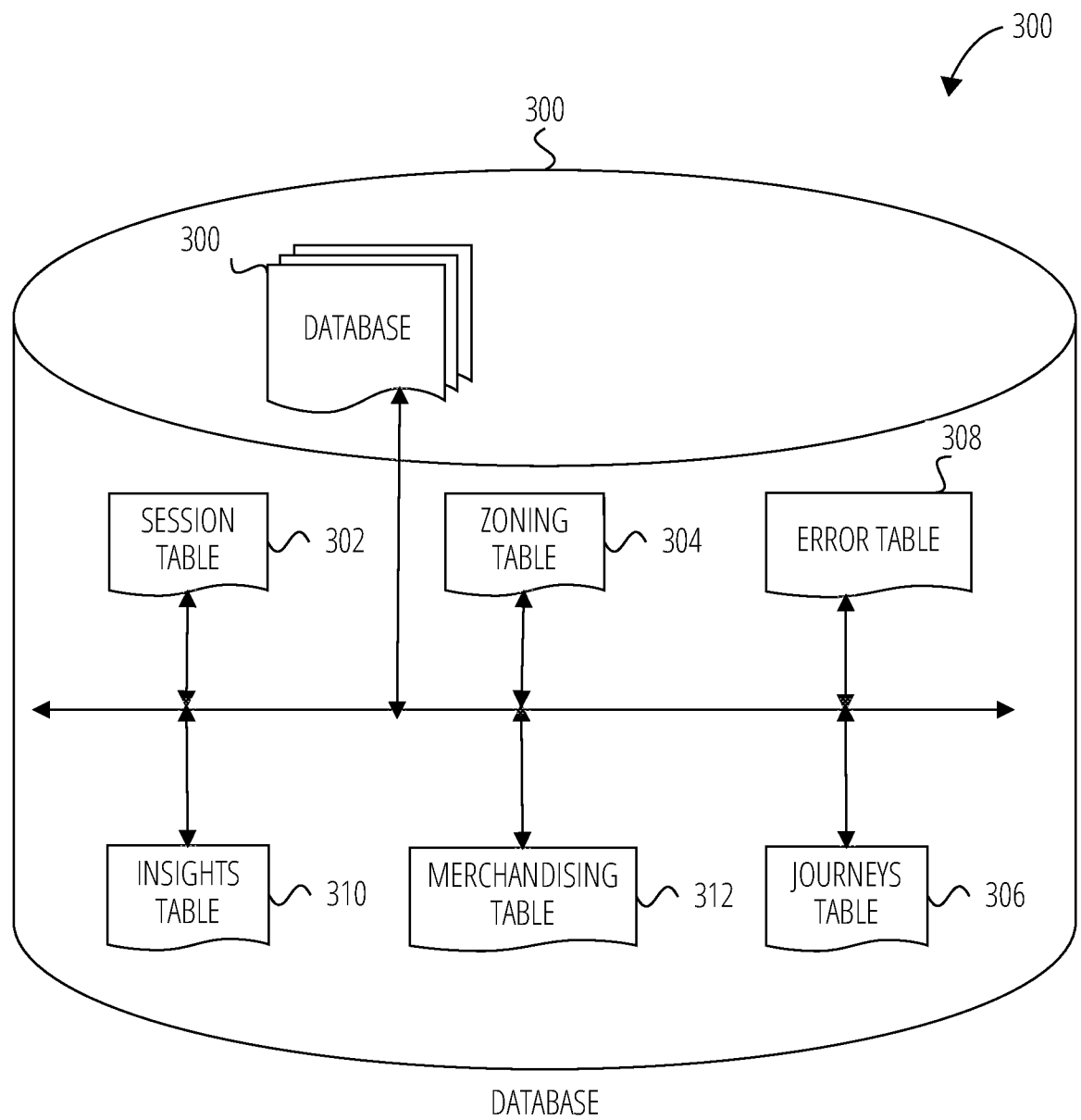
FIG. 3 is a diagrammatic representation of a data structure as maintained in a database, in accordance with some examples.

FIG. 3 is a schematic diagram illustrating database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a database 300, a session table 302, a zoning table 304, an error table 308, an insights table 310, a merchandising table 312, and a journeys table 306.

The database 300 stores data regarding the websites and native applications associated with the clients of the experience analytics system 100. The database 300 can store information on the contents of the website or the native application, the changes in the interface of the website being displayed on the customer client device 104, the elements on the website being displayed or visible on the interface of the customer client device 104, the text inputs by the user into the web site, a movement of a mouse (or touchpad or touch screen) cursor and mouse (or touchpad or touch screen) clicks on the interface of the website, etc. The database 300 can also store data tags and results of data science and data engineering processes on the data. The database 300 can also store information such as the font, the images, the videos, the native scripts in the website or applications, etc.

The session table 302 stores session replays for each of the client's websites and native applications. Session replays may include session events associated with browsing sessions. In one or more embodiments, session events correspond to user interactions with one or more elements, sections, zones (e.g., stored in association with the zoning table 304 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 302, and may include one or more event descriptors including the event type, the event target, such as a specific button or text box, the event time, and the like, as well as combinations thereof.

The zoning table 304 stores data related to the zoning for each of the client's websites and native applications including the zones to be created and the zoning overlay associated with the websites and native applications. The journeys table 306 stores data related to the journey of each visitor to the client's website or through the native application. The error table 308 stores data related to the errors generated by the errors system 218 and the insights table 310 stores data related to the insights generated by the insights table 310.

The merchandising table 312 stores data associated with the merchandising system 212. For example, the data in the merchandising table 312 can include the product catalog for each of the clients, information on the competitors of each of the clients, the data associated with the products on the websites and applications, the analytics on the product opportunities and the performance of the products based on the zones in the website or application, etc.

Figure 4:
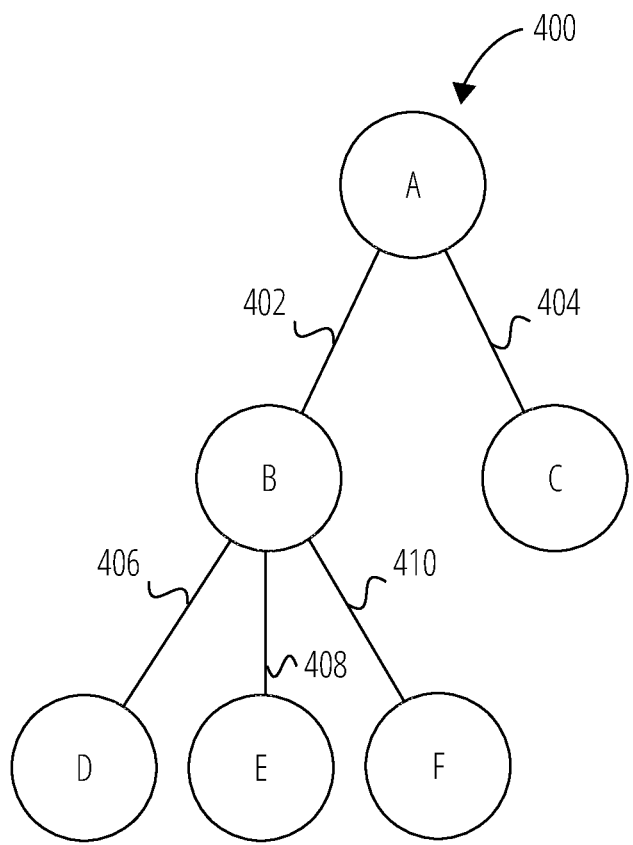
FIG. 4 illustrates an unlabeled document object model (DOM) tree, in accordance with some examples.

FIG. 4 illustrates an unlabeled document object model (DOM) tree 400, in accordance with some examples. In one or more embodiments, the unlabeled DOM tree 400 provides a visual representation of the hierarchical structure of a webpage's HTML code, with content zones or elements (e.g., as defined by the zoning system 206) represented as nodes A-F.

In the example unlabeled DOM tree 400, related nodes A-F are joined by links 402-410, representing the relationships between any two of the nodes A-F. In the example unlabeled DOM tree 400, a link 402 is established between nodes A and B, a link 404 is established between nodes A and C, a link 406 is established between nodes B and D, a link 408 is established between nodes B and E, and a link 410 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 5:
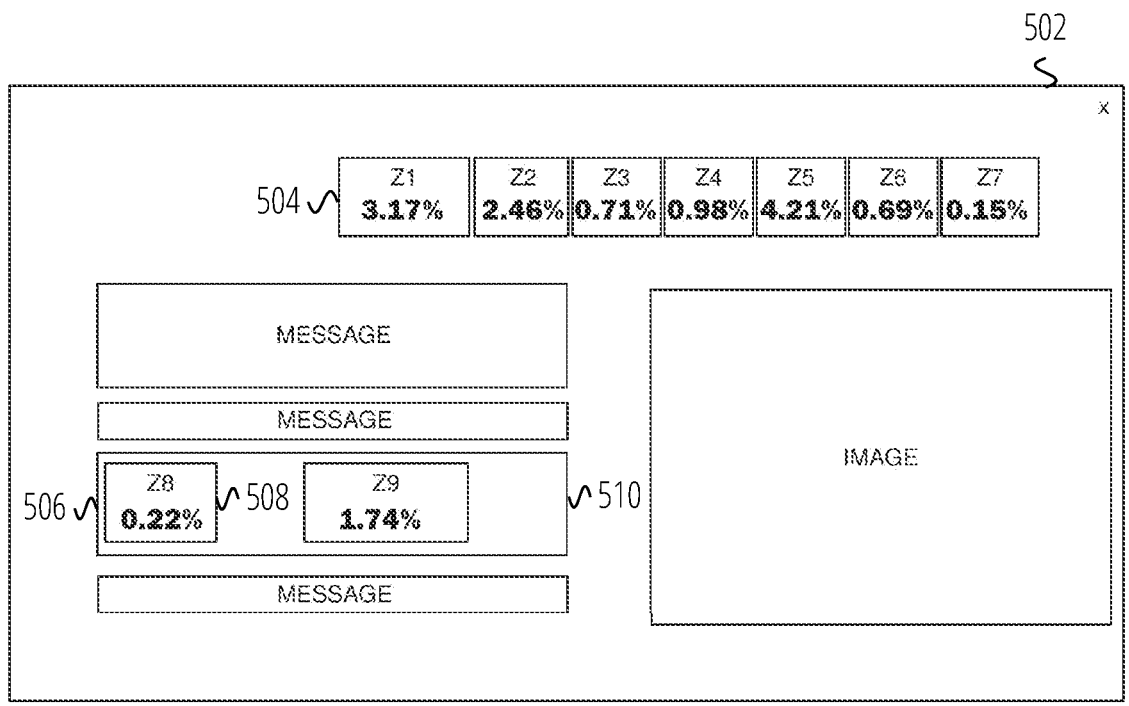
FIG. 5 is a user interface for presenting a webpage with performance information for zones in a webpage, according to some example embodiments.

FIG. 5 is a user interface 502 for presenting a webpage with performance information for zones in a webpage, in accordance with some examples. As discussed above, zones refer to the various content elements, fields, and other web components, that form the user-facing portions of a webpage or website. As an example, an online shopping web site may include a search bar, a "go to cart" button, and a "home page" button, where the search bar and the various buttons are each webpage zones.

Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zone 504, 506, 508, 510), metrics may be overlaid on the zones for an easy way to compare zone metrics. The zone metrics include hover rate, click recurrence, attractiveness rate, exposure rate, and exposure time, but other metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone. The exposure rate is the percentage of page views where at least half of the zone was visible on the screen, and the exposure rate indicates how far the users are scrolling. Further, the exposure time is the average time with at least half of the zone is visible on the screen and indicates how long the zone is visible.

In the illustrated example in FIG. 5, the click recurrence for each zone is shown over imposed over the zone. For example, zone 504 shows that 2.34% of the users that view the zone click on the zone. Zones may also include other zones within, such as zone 506 that includes zone 508 (click recurrence of 0.22%) and zone 510 (click recurrence of 1.74%).

Regarding the exposure rate, in some example embodiments, the test of whether a user views the zone is that the user views at least a threshold portion of the zone. For example, viewing the zone may correspond with viewing the top half of the zone, corresponding to the vertical middle point of the zone is exposed to the user. The threshold may be configured by the user.

Figure 6:
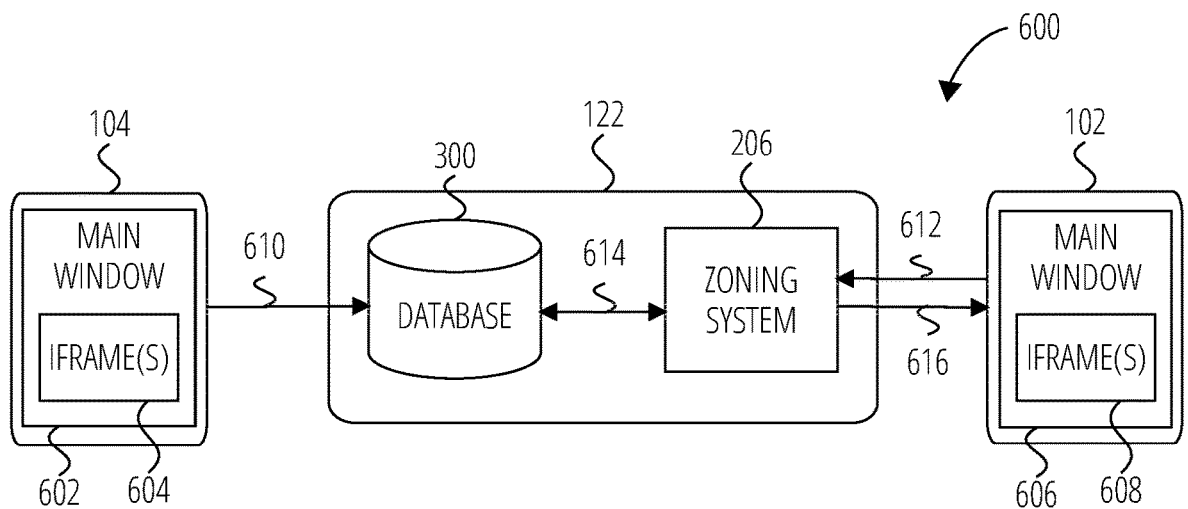
FIG. 6 illustrates a high-level architecture for tracking session events for an iframe within a webpage, in accordance with some examples.

FIG. 6 illustrates a high-level architecture 600 for tracking session events for an iframe within a webpage, in accordance with some examples. For explanatory purposes, the high-level architecture 600 is primarily described herein with reference to the member client device 102, the customer client device 104 and the experience analytics server 122 of FIG. 1. However, the high-level architecture 600 may correspond to one or more other components and/or other suitable devices.

In the example of FIG. 6, a user (e.g., customer) at the customer client device 104 accesses a webpage including a main window 602. The webpage includes one or more iframe(s) 604 embedded within the main window 602. The user interacts with the webpage, with such interactions corresponding to session events performed with respect to the webpage. As noted above, the session events may include entering text in a text box, clicking a button with a mouse, tapping a button with a touchscreen, navigating to a webpage, navigating away from a webpage, scrolling up or down on the webpage, hovering over a webpage element, and the like. The session events include first session events performed with respect to the main window 602, and second session events performed with respect to the iframe(s) 604.

In one or more embodiments, the experience analytics script 114 of customer client device 104 is configured to track the first and second session events. For example, the experience analytics script 114 may be implemented in part as a primary tracking tag for the main window 602, for tracking the first session events within the main window 602. In addition, the experience analytics script 114 may be implemented in part as a respective child tracking tag(s) for tracking the session events within the iframe(s) 604. The use of a primary tracking tag in conjunction with child tracking tag(s) is discussed further below with respect to FIG. 7.

At operation 610, the customer client device 104 provides for batching the first and second session events into a pipeline, for example, in a serialized format. The experience analytics server 122 is configured to receive the serialized, batched first and second session events, and to store such session events in the database 300.

In the example of FIG. 6, operation 610 corresponds to a first phase which relates to storing session events (e.g., user interactions) for the webpage. Moreover, operations 612-616 correspond to a second phase which relates to presenting corresponding metrics (e.g., zoning metrics) and/or performing session replay based on the first session events of the main window 602 and the second session events of the iframe(s) 604. It may be understood that the second phase may occur shortly after the first phase, or after an extended period of time after the first phase.

Regarding the second phase, a member user at the member client device 102 may request (e.g., via user input) to view metrics (e.g., zoning metrics) for the webpage. In response, the member client device 102 provides a request to the experience analytics server 122 for the metrics (operation 612). In response to the receiving the request, the zoning system 206 of the experience analytics server 122 accesses the serialized, batched first and second session events stored in the database 300 (operation 614).

Moreover, the experience analytics server 122 provides for unserializing the stored first and second session events. The experience analytics server 122 in conjunction with the zoning system 206 is to determine zoning metrics for zones the main window 602 and the iframe(s) 604 based on the unserialized data. The zoning system 206 sends an indication of the zoning metrics to the member client device 102 (operation 616). In response, the member client device 102 provides for display of the zoning metrics in association with a main window 606 (e.g., corresponding to the main window 602) and iframe(s) 608 (e.g., corresponding to the iframe(s) 604) on the member client device 102. For example, the zoning metrics are presented as overlays with respect to the main window 606 and iframe(s) 608 displayed on the member client device 102.

While the example of FIG. 6 is depicted as a single customer client device 104, it is possible that the experience analytics server 122 provides for aggregating session events (e.g., serialized, batched first and second session events) from multiple customer client devices 104. The aggregated data may be stored in the database 300, and usable by the zoning system 206 to present zoning metrics with respect to the plural customer client device 104. In addition, the experience analytics server 122 may provide a user interface for a member at the member client device 102 to specify a time period (e.g., the last day, week, month, or specified date range) for determining zoning metrics.

In addition, while the example of FIG. 6 is described with respect to zoning metrics, it is also possible for the member user to alternatively or in addition perform session replay. In response to such a request, the session replay system 208 may access the serialized, batched first and second session events, perform unserialization, and perform session replay.

Figure 7:
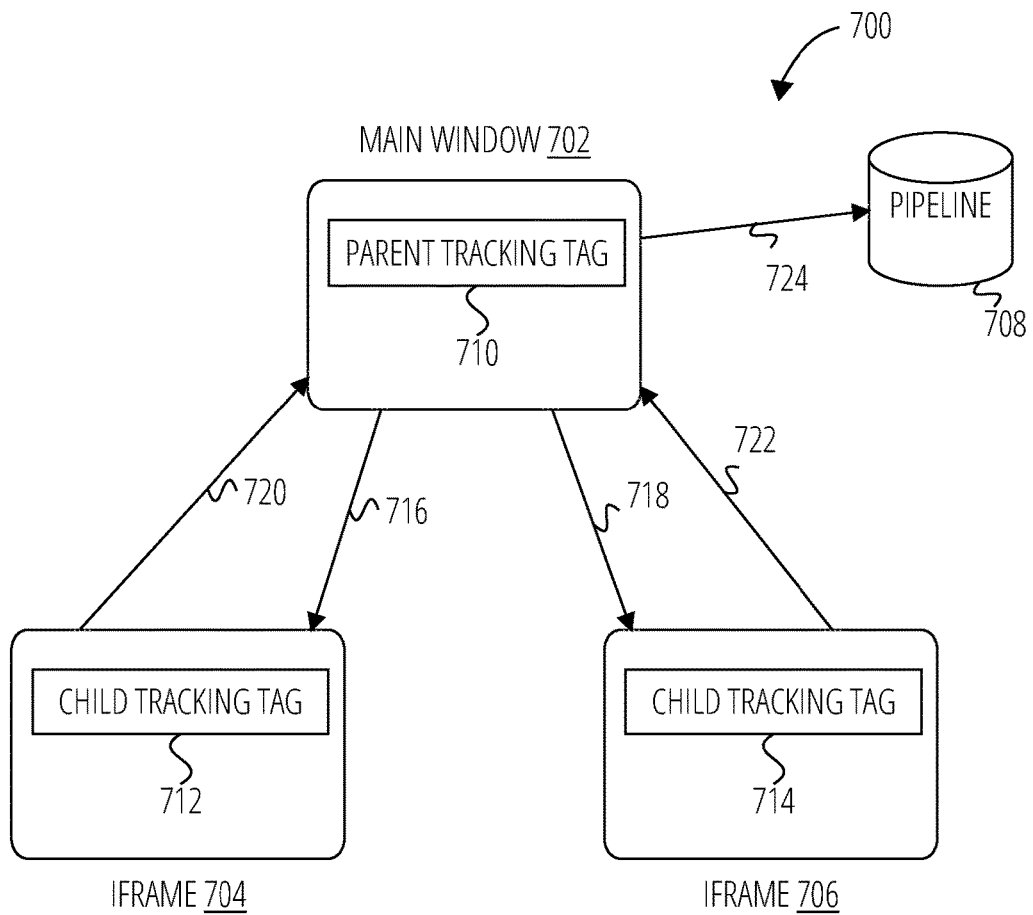
FIG. 7 illustrates a pipeline architecture for batching session events for a webpage that includes an iframe, in accordance with some examples.

FIG. 7 illustrates a pipeline architecture 700 for batching session events for a webpage that includes an iframe, in accordance with some examples. For explanatory purposes, the pipeline architecture 700 is primarily described herein with reference to the member client device 102 of FIG. 1. However, the pipeline architecture 700 may correspond to one or more other components and/or other suitable devices.

In one or more embodiments, the batching of session events depicted in FIG. 7 corresponds at least in part to operation 610 of FIG. 6. The pipeline architecture 700 includes a main window 702 (e.g., similar to the main window 602 of FIG. 6), as well as iframes 704-706 (e.g., similar to iframe(s) 604 of FIG. 6). A customer user at the customer client device 104 accesses a webpage including the main window 702. The main window 702 includes nested iframes 704-706. The user interacts with the webpage, where the interactions correspond to session events performed with respect to the webpage. As noted above with respect to FIG. 6, session events across plural customer users at respective customer client devices 104 may be aggregated for zoning metrics.

The parent tracking tag 710 of the main window 702 is configured to collect session events from the main window 702, to receive session events from the child tracking tags 712-714 of the iframes 704-706, and to all collected session events in batched form to the pipeline 708 (e.g., for storage in the database 300). In this regard, the child tracking tags 712-714 of the iframes 704-706 are configured to collect their respective session events, and pass such second session events directly to the parent tracking tag 710 of the main window 702.

Thus, the batched session events include first session events performed with respect to the main window 602, and second session events performed with respect to the iframes 704-706. In one or more embodiments, the parent tracking tag 710 in conjunction with the main window 702 provides for setting the session cookie (e.g., managing the current browsing session), sending requests to the experience analytics server 122, and messaging with the child tracking tags 712-714 in order to receive session events therefrom.

Each iframe includes a respective child tracking tag. In the example of FIG. 7, the iframe 704 includes a child tracking tag 712 configured to track those second session events corresponding to the iframe 704, and the iframe 706 includes a child tracking tag 714 configured to track those second session events corresponding to the child tracking tag 714. The child tracking tags 712-714 in conjunction with the iframes 704-706 provides for passing session events to the parent tracking tag 710 of the main window 702. In one or more embodiments, the child tracking tags 712-714 prohibit changing the session cookie (e.g., thereby disallowing management of the session), and prohibit the direct sending of requests to the experience analytics server 122.

In the example of FIG. 7, the parent tracking tag 710 is configured to find all iframes (e.g., iframes 704-706) within the webpage. For example, the parent tracking tag 710 is configured to traverse the DOM corresponding to the webpage for all nodes corresponding to iframes. At operations 716-718, the parent tracking tag 710 determines a respective identifier for each iframe, and sends the respective identifier to each of the iframes 704-706. In one or more embodiments, the messaging between the parent tracking tag 710 and the iframes 704-706 is performed via a postMessage call, since such calls are typically usable for passing messages to iframes on different domains.

Each of the child tracking tags 712-714 is configured to store or otherwise maintain its identifier, and to use the identifier to send subsequent messages (e.g., via a postMessage call) to the parent tracking tag 710. Thus, at operations 720-722, the parent tracking tag 710 is configured to receive session events (e.g., with respective identifiers) from the child tracking tags 712-714.

In one or more embodiments, each second session event is sent in a separate message, from one of the child tracking tags 712-714, to the parent tracking tag 710. Moreover, session events that are debounced or throttled may be debounced or throttled by the respective child tracking tags 712-714, for example, to reduce the number of messages for sending. Based on the identifier provided with a message, the parent tracking tag 710 is able to rebuild the path when receiving messages from a child tracking tag. The rebuild path is performed at each session event received, for example, in case of a DOM change inside the main window 702.

In one or more embodiments, the pipeline architecture 700 is configured account for different scenarios regarding the loading times of the main window 702 relative to the iframes 704-706. Example scenarios include: (1) the parent tracking tag loading prior to the loading of the child tracking tag (e.g., this allows the child tracking tag to check that it is inside an iframe and to get an answer from the parent tracking tag); (2) the parent tracking tag loading after loading of the child tracking tag; (3) the child tracking tag being dynamically added after the parent tracking tag is loaded (e.g., which affects how the parent tracking tag detects there is a new iframe and child tracking tag); and (4) the parent tracking tag not being present in the main window.

In general, a tracking tag during boot may not be able to determine whether the tracking tag is a child (e.g., iframe context) if the parent tracking tag is not loaded yet, or to determine whether the tracking tag is a parent if the child tracking tag is not loaded yet. Thus, the pipeline architecture 700 may provide for a given tracking tag at boot to send a message (e.g., a discovery message) to the other tracking tag.

For example, in the context of an iframe at boot, the child tracking tag detects that the iframe is in context. The child tracking tag sends a discovery message to the parent tracking tag (e.g., via a property type="discovery" string) to identify the message as a discovery message. The child tracking tag then waits for an answer from the parent tracking tag. When the answer is received from the parent tracking tag (e.g., containing an identifier), the child tracking tag starts tracking and passes a message to parent with the identifier. In the context of an iframe at boot, if a discovery message is received from the parent tracking tag (e.g., a message with type "discovery" and including an identifier), the child tracking tag updates the identifier used for message identification.

In the context of the main window (e.g., main window 702) at boot, the parent tracking tag finds all iframes, and identifies each by an identifier. The parent tracking tag sends, to all iframes, the discovery message containing the discovery string and the unique identifier for each iframe (e.g., iframes 704-706). In the context of the main window during runtime, if the parent tracking tag receives a discovery message from a child tracking tag (e.g., a message containing type="discovery"), the parent tracking tag restarts same process to identify and send identifiers to each iframe.

In this manner, the child tracking tag can report its loading to the parent tracking tag. In addition, the parent tracking tag can send the identifier(s) to the child tracking tag(s).

Regarding above example scenario (1), the parent tracking tag sends a discovery message containing identifiers to each iframe (e.g., where no child loaded in the iframe corresponds to no answer). When a child is loaded, the child tracking tag sends a discovery message to the parent tracking tag. The main window receives the discovery message from the child tracking tag, and the parent tracking tag sends a message containing the identifier to each iframe. The iframe(s) receive the discovery message containing the unique identifier, to use for all the following messages for sending to the parent tracking tag (e.g., all messages containing events), and data collection starts.

Regarding above scenario (2), when a child tracking tag is loaded, the child tracking tag sends a discovery message to the parent tracking tag (e.g., where no loaded parent corresponds to no answer). When the parent tracking tag boots, the parent tracking tag sends a discovery message containing the identifier to each iframe. The iframe receives the discovery message with the identifier, which is used for subsequent messages to send to the parent tracking tag (e.g., with all messages containing events), and data collection starts.

Regarding above scenario (3), the parent tracking tag in the main window and the child tracking tag are already loaded and initialized. An iframe is dynamically added. When the child tracking tag is loaded, the child tracking tag sends a discovery message to the parent tracking tag. The main window receives the discovery message from the child tracking tag, finds all iframes, and sends a discovery message with the respective identifiers to all iframes. The iframes receive a respective message containing the identifier, which is used for subsequent messages to send to the parent tracking tag (e.g., all messages containing events), and data collection starts.

Regarding above scenario (4), when a child tracking tag is loaded, it typically sends a discovery message to the parent tracking tag. However, with no parent there is no corresponding answer, and data collection does not start. Thus, in one or more embodiments, the pipeline architecture 700 may provide for adding a feature flag, to facilitate enable and/or disable parent and/or child behavior. At tracking tag boot, in the iframe context, if the feature flag is disabled, the tracking tag may function as the normal (e.g., parent) tracking. If the feature flag is enabled, the tracking tag may function as a child tracking tag.

In one or more embodiments, messages passed between a parent tracking tag and a child tracking tag have the following fields: iframe_message (e.g., a string property present in each message from parent or child tracking tag to ensure the message comes from tracking tag); from (e.g., to indicate if message is issued from a parent or a child); type (e.g., including "discovery" which from a parent this message will contain a id field and which from a child there is no specific field, "stop" which is from parent to stop tracking in case of optout/exclusion, and "event" which is from child to send 1 analysis event collected in iframe); id (e.g., iframe identifier that a child uses to send in their message, set by the last discovery message they received from parent tracking-tag); and/or event (e.g., which contains an analysis event sent by child tracking-tag)

Thus, the parent tracking tag 710 of the main window 702 is configured to collect first session events for the main window 702, and to receive second session events from the child tracking tags 712-714 for the iframes 704-706. At operation 724, the parent tracking tag 710 provides for sending batched session events to the pipeline 708.

As noted above with respect to FIG. 6, the batching the first and second session events into the pipeline 708 may be in a serialized format. The experience analytics server 122 is configured to receive the serialized, batched first and second session events, and to store such session events in the database 300. Moreover, when a member user at the member client device 102 requests to view metrics (e.g., zoning metrics), the zoning system 206 of the experience analytics server 122 accesses the serialized, batched first and second session events stored in the database 300 and unserializes the stored first and second session events.

In one or more embodiments, the serialization and unserialization of iframes is handled different than serialization of unserialization of webpages without iframes. Regarding the unserialization a webpage without iframes, elements can be unserialized and appended to parent elements, based on DOM methods allowing for recursively building HTML documents piece by piece. In other words, unserialized children are recursively appended to parent elements.

However, in following this method for iframes, the iframe node would be unserialized, and the recursively unserialized document would be attached to it (e.g., in the children attribute). In doing so, the iframe would not yet be loaded, and it would be necessary to wait for the full unserialization of all elements of a webpage to load it. For example, the Javascript DOM API prevents a document from being appended to an iframe element if this not loaded in the window. Thus, it may not be desirable for an iframe to be unserialized like other elements, since it is possible to append elements to common ones even if the unserialized page is not yet loaded in the window.

In one or more embodiments, the experience analytics server 122 provides for unserializing iframes in a different manner. When an iframe is loaded in the window, the iframe automatically creates its own document that will contain a HTML element that will also contain an empty body and head. In general, a document is not replaced from its iframe since the access of this document is read-only.

In view of this, the experience analytics server 122 provides for replacing the whole HTML element inside the document, once the iframe is loaded and has its document. In one or more embodiments, the experience analytics server 122 waits for each iframe to be loaded before unserializing and appending its children to its automatically created document.

Regarding the serialization of iframes, for a client iframe, it is not necessary to serialize its attached document. Rather, the HTML elements attached to this document may be serialized. As noted above, when loading an unserialized iframe, a new document is already attached thereto.

The experience analytics server 122 may provide for keeping the base URI for the document, for transforming the URLs to fetch resources. With this format of serialization, it is not necessary to keep the document, but the baseURI. During unserialization, the iframe will wait to be loaded before unserializing the HTML element as its children. Moreover, since the loaded iframe will have already its own document, the inner document may be replaced by the unserialized HTML element mentioned above.

Figure 8:
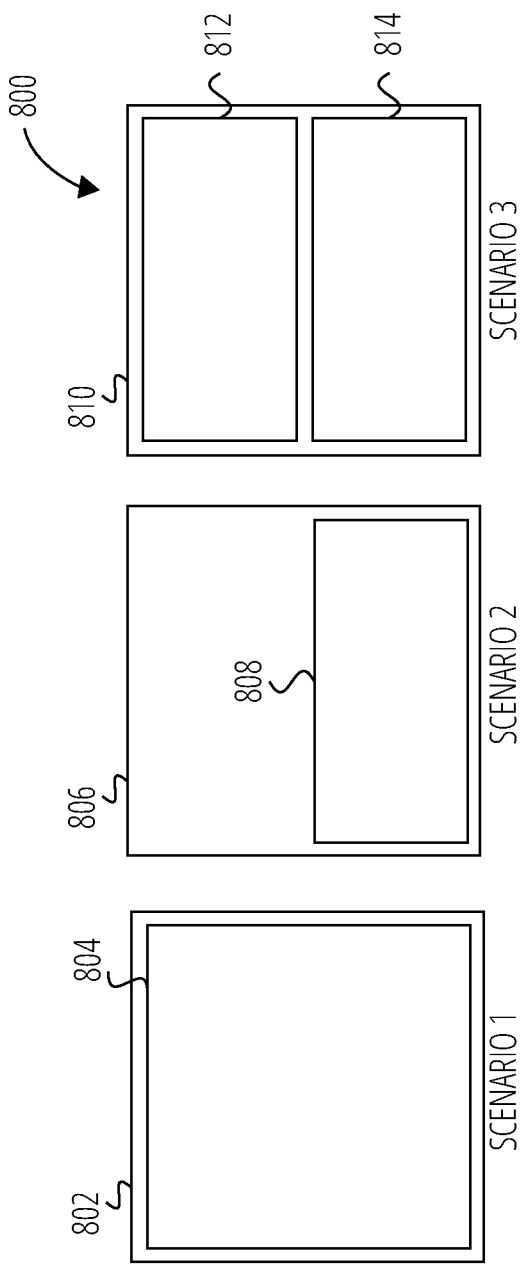
FIG. 8 illustrates example scenarios associated with webpage navigation with respect to iframe(s), in accordance with some examples.

FIG. 8 illustrates example scenarios 800 associated with webpage navigation with respect to iframe(s), in accordance with some examples. The example of FIG. 8 depicts example Scenarios 1, 2 and 3, each of which represent different scenarios for navigation areas (e.g., available area for user interaction) at the customer client device 104 with respect to a webpage including a main window and one or more iframe(s).

Scenario 1 illustrates an example in which the entire navigation area is in the iframe 804, as the iframe 804 occupies the whole available area for user interaction within the main window 802. Scenario 2 illustrates an example in which the navigation area is partially within the iframe 808 and partially within the iframe 808, as the iframe 808 occupies only part of the available area for user interaction within the main window 806. Scenario 3 illustrates an example in which the navigation is partially within the iframe 812 and partially within the iframe 814, as the iframes 812-814 as combined occupy the whole available area for user interaction within the main window 810.

As noted above with respect to FIG. 6 and FIG. 7, the experience analytics system 100 provides for tracking session events for webpages with iframes, by including tracking tags at the main window level and each respective iframe. Session events are passed from the iframes to the main window, based on unique identifiers assigned to each of the iframes. The tracking of session events is possible in each of the above Scenarios 1 to 3. In addition, the tracking of session events is possible when the iframe (e.g., the iframe src) is on the same domain and sub-domain as the main window, the iframe is on the same domain but different sub-domain as the main window, and/or the iframe content is built with Javascript (e.g., no iframe src).

Figure 9:
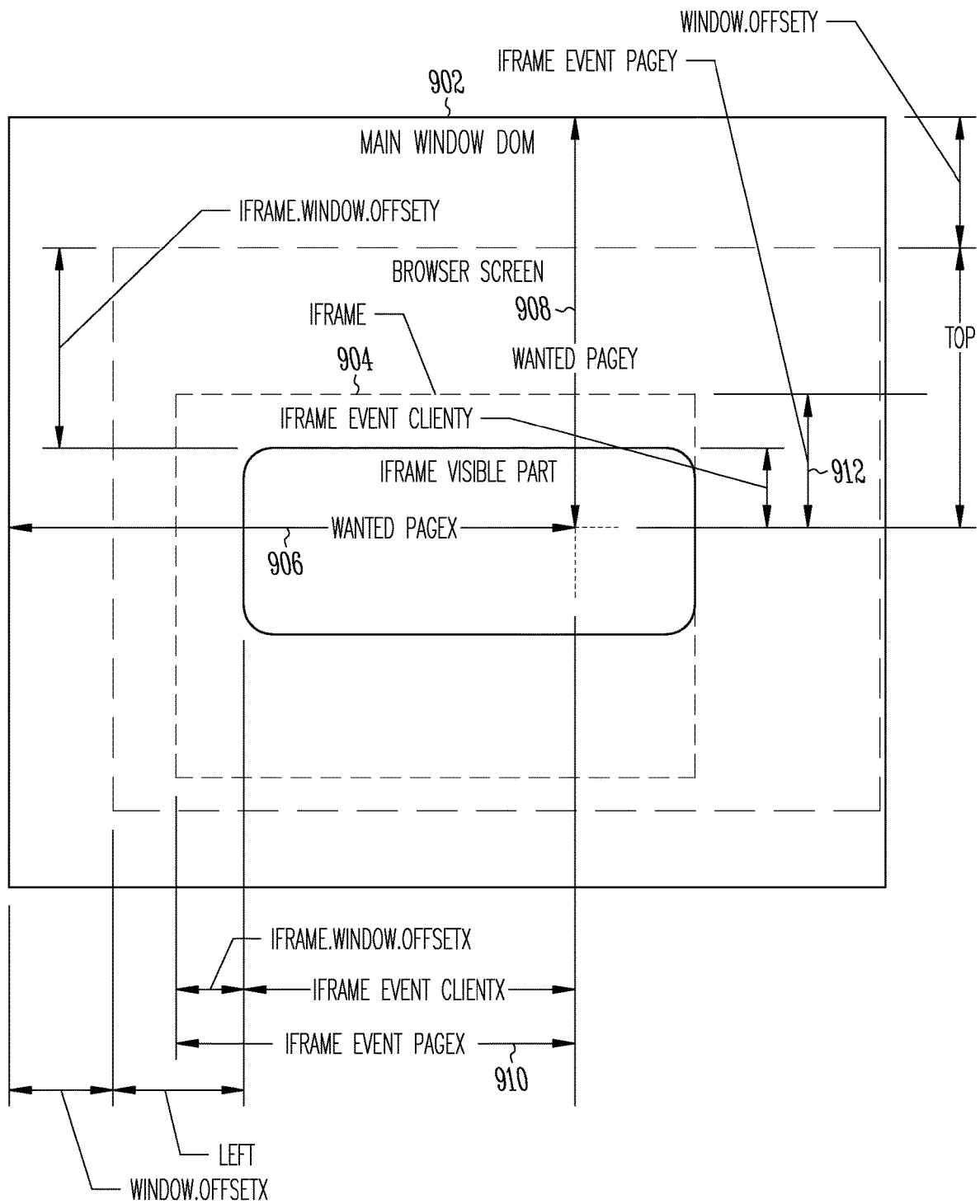
FIG. 9 illustrates example of calculating offset values for iframe session events, in accordance with some examples.

FIG. 9 illustrates an example of calculating offset values for iframe session events, in accordance with some examples. In one or more embodiments, events containing a mouse position are fixed by the parent tracking tag corresponding to the main window DOM 902. The mouse position coordinates are relative to the iframe 904. In one or more embodiments, the child tracking tag for the iframe 904 sends pageX/pageY, corresponding to values 910-912. In a case where there were no iframe, this may correspond with values 906-908.

In one or more embodiments, the parent tracking tag, when receiving information from the iframe, may call getBoundingClientRect( ) for information from iframe element to recompute x/y as if it was a mouseEvent pageX/pageY not from an iframe (e.g., const x=xFromChild+left+window.offsetX; and const y=yFromChild+top+window.offsetY).

Figure 10:
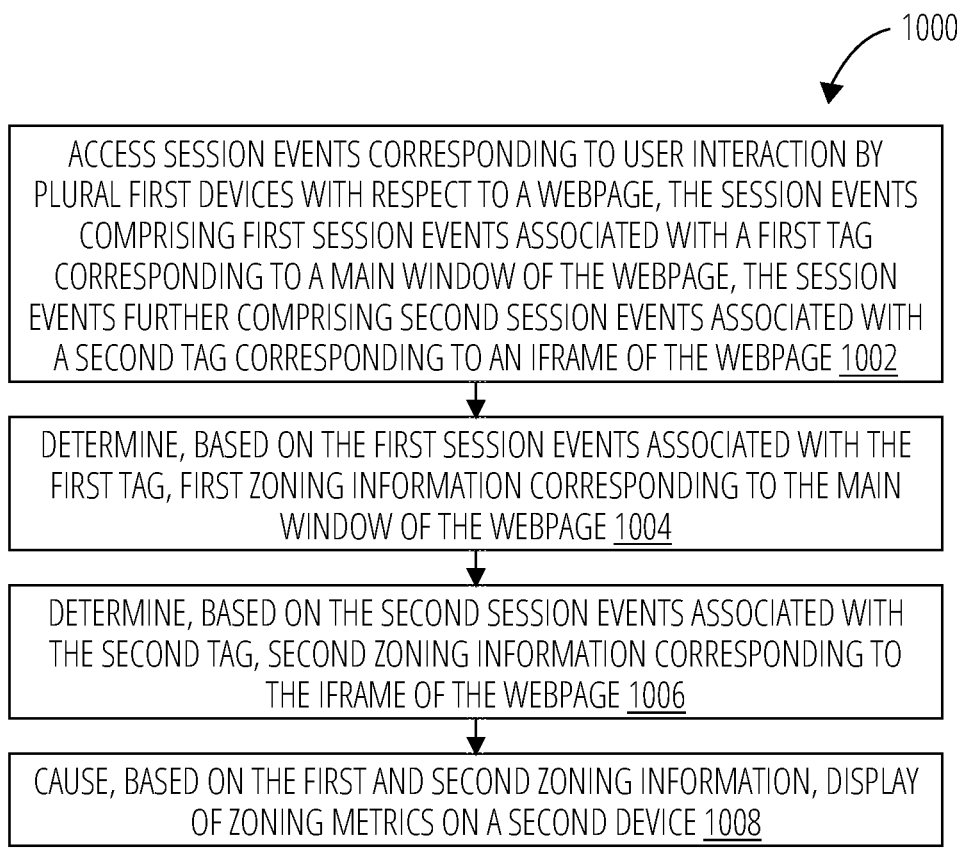
FIG. 10 is a flowchart illustrating a process for tracking session events for an iframe within a webpage, in accordance with some examples.

FIG. 10 is a flowchart illustrating a process 1000 for tracking session events for an iframe within a webpage, in accordance with some examples. For explanatory purposes, the process 1000 is primarily described herein with reference to the customer client device 104 and the experience analytics server 122 of FIG. 1. However, one or more blocks (or operations) of the process 1000 may be performed by one or more other components, and/or by other suitable devices. Further for explanatory purposes, the blocks (or operations) of the process 1000 are described herein as occurring in serial, or linearly. However, multiple blocks (or operations) of the process 1000 may occur in parallel or concurrently. In addition, the blocks (or operations) of the process 1000 need not be performed in the order shown and/or one or more blocks (or operations) of the process 1000 need not be performed and/or can be replaced by other operations. The process 1000 may be terminated when its operations are completed. In addition, the process 1000 may correspond to a method, a procedure, an algorithm, etc.

The experience analytics server 122 accesses session events corresponding to user interaction by plural first devices with respect to a webpage (block 1002). The session events include first session events associated with a first tracking tag corresponding to a main window of the webpage, the session events further comprising second session events associated with a second tracking tag corresponding to an iframe of the webpage.

Each of the main window and the iframe may correspond to a first domain. Alternatively, the main window may correspond to a first domain, and the iframe may correspond to a second domain which is a subdomain of the first domain.

The experience analytics server 122 determines, based on the first session events associated with the first tracking tag, first zoning information corresponding to the main window of the webpage (block 1004). The experience analytics server 122 determines, based on the second session events associated with the second tracking tag, second zoning information corresponding to the iframe of the webpage (block 1006).

The first tracking tag may be configured to track the first session events within the main window for each of the plural first devices. The second tracking tag may be configured to track the second session events within the iframe for each of the plural first devices. The second tracking tag may correspond to a child of the first tracking tag, such that the second tracking tag passes the second session events to the first tracking tag.

The first tracking tag may be configured to batch the first session events tracked by the first tracking tag with the second session events passed by the second tracking tag, and to send the batched first and second session events to a pipeline for storage in a database. The batched first and second session events may be stored in the database in a serialized format.

The experience analytics server 122 causes, based on the first and second zoning information, display of zoning metrics on a second device (block 1008). The zoning metrics may be displayed on the second device as overlays on respective zones within the main window and the iframe.

Accessing the session events may include performing an unserialization with respect to the serialized format of the batched first and second session events stored in the database. Unserializing the iframe may include waiting for the iframe to be loaded before unserializing HTML elements as children with respect to the iframe.

Machine Architecture

Figure 11:
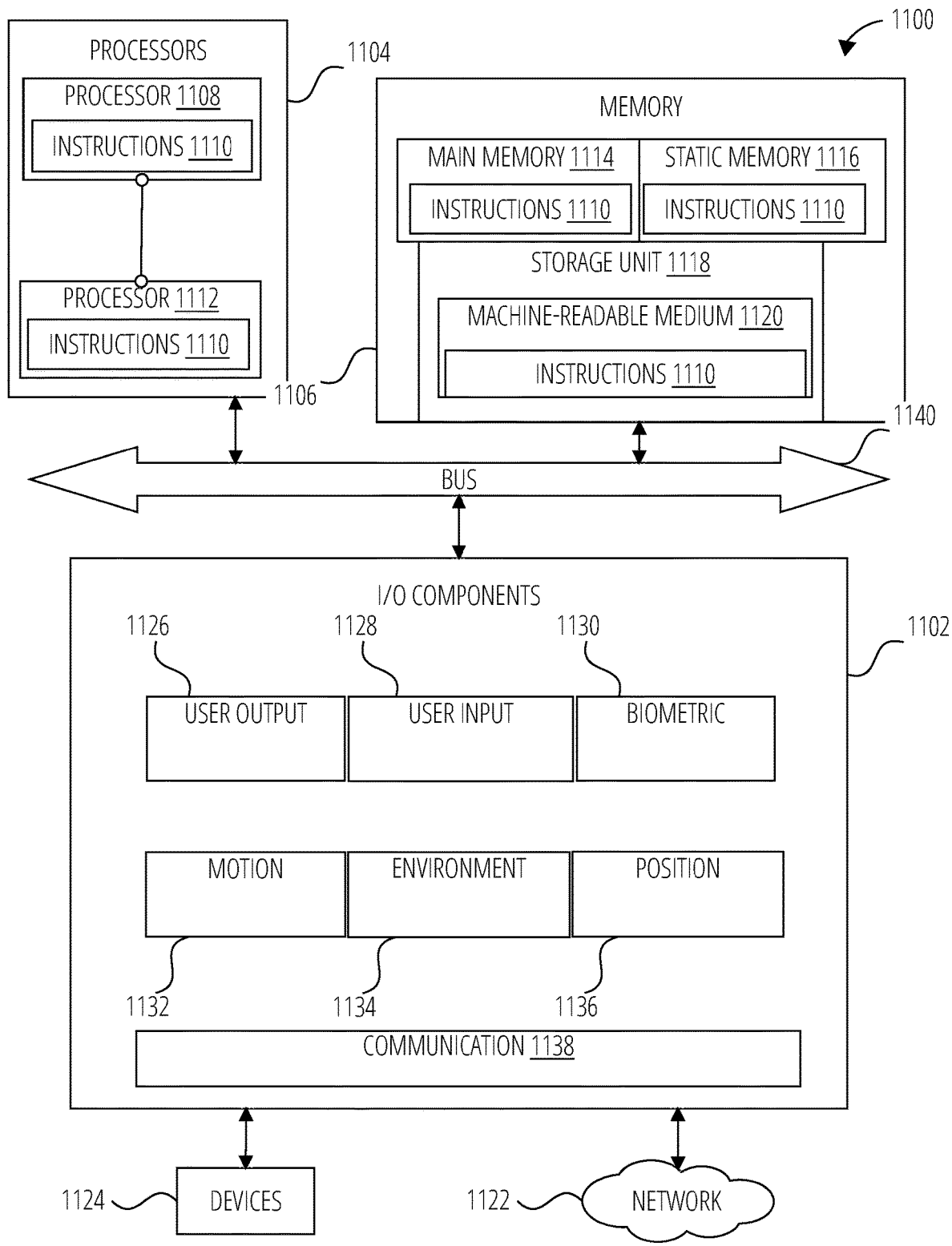
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an application, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the processors 1104 or any one of a number of server devices forming part of the experience analytics server 122. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the processors 1104 may have a camera system comprising, for example, front cameras on a front surface of the processors 1104 and rear cameras on a rear surface of the processors 1104. The front cameras may, for example, be used to capture still images and video of a user of the processors 1104 (e.g., "selfies"). The rear cameras may, for example, be used to capture still images and videos in a more traditional camera mode. In addition to front and rear cameras, the processors 1104 may also include a 360° camera for capturing 360° photographs and videos.

Further, the camera system of a processors 1104 may include dual rear cameras (e.g., a primary camera as well as a depth-sensing camera), or even triple, quad or penta rear camera configurations on the front and rear sides of the processors 1104. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Software Architecture

Figure 12:
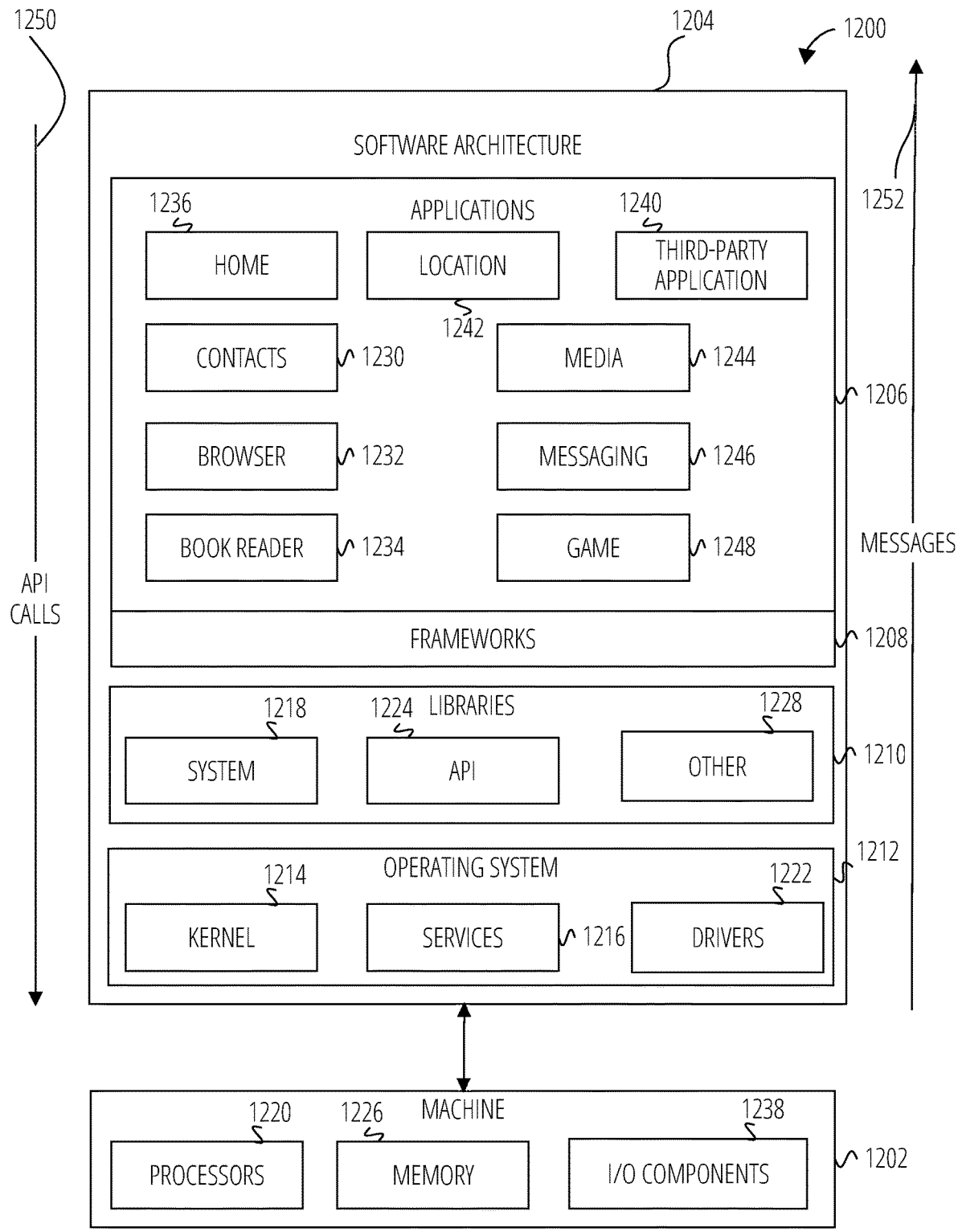
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   accessing session events corresponding to user interaction by plural first devices with respect to a webpage, the session events comprising first session events associated with a first tracking tag corresponding to a main window of the webpage, the session events further comprising second session events associated with a second tracking tag corresponding to an iframe of the webpage;

determining, based on the first session events associated with the first tracking tag, first zoning information corresponding to the main window of the webpage;

determining, based on the second session events associated with the second tracking tag, second zoning information corresponding to the iframe of the webpage; and causing, based on the first and second zoning information, display of zoning metrics on a second device, wherein the first tracking tag is configured to send a first message to the second tracking tag, the first message comprising a unique identifier for the iframe, and wherein the second tracking tag is configured to send a second message to the first tracking tag, the second message comprising a discovery message to indicate when the second tracking tag is loaded.

2. The method of claim 1, wherein the first tracking tag is configured to track the first session events within the main window for each of the plural first devices, and wherein the second tracking tag is configured to track the second session events within the iframe for each of the plural first devices.

3. The method of claim 2, wherein the second tracking tag corresponds to a child of the first tracking tag, such that the second tracking tag passes the second session events to the first tracking tag.

4. The method of claim 3, wherein the first tracking tag is configured to batch the first session events tracked by the first tracking tag with the second session events passed by the second tracking tag, and to send the batched first and second session events to a pipeline for storage in a database.

5. The method of claim 4, wherein the batched first and second session events are stored in the database in a serialized format.

6. The method of claim 5, wherein accessing the session events comprises:

performing an unserialization with respect to the serialized format of the batched first and second session events stored in the database.

7. The method of claim 6, wherein unserializing the iframe includes waiting for the iframe to be loaded before unserializing HTML elements as children with respect to the iframe.

8. The method of claim 1, wherein the zoning metrics are displayed on the second device as overlays on respective zones within the main window and the iframe.

9. The method of claim 1, wherein each of the main window and the iframe correspond to a first domain.

10. The method of claim 1, wherein the main window corresponds to a first domain, and the iframe corresponds to a second domain which is a subdomain of the first domain.

11. A system comprising:
a processor; and
a memory storing instructions that, when executed by the processor, configure the processor to perform operations comprising:
accessing session events corresponding to user interaction by plural first devices with respect to a webpage, the session events comprising first session events associated with a first tracking tag corresponding to a main window of the webpage, the session events further comprising second session events associated with a second tracking tag corresponding to an iframe of the webpage;

determining, based on the first session events associated with the first tracking tag, first zoning information corresponding to the main window of the webpage;

determining, based on the second session events associated with the second tracking tag, second zoning information corresponding to the iframe of the webpage; and causing, based on the first and second zoning information, display of zoning metrics on a second device, wherein the first tracking tag is configured to send a first message to the second tracking tag, the first message comprising a unique identifier for the iframe, and wherein the second tracking tag is configured to send a second message to the first tracking tag, the second message comprising a discovery message to indicate when the second tracking tag is loaded.

12. The system of claim 11, wherein the first tracking tag is configured to track the first session events within the main window for each of the plural first devices, and wherein the second tracking tag is configured to track the second session events within the iframe for each of the plural first devices.

13. The system of claim 12, wherein the second tracking tag corresponds to a child of the first tracking tag, such that the second tracking tag passes the second session events to the first tracking tag.

14. The system of claim 13, wherein the first tracking tag is configured to batch the first session events tracked by the first tracking tag with the second session events passed by the second tracking tag, and to send the batched first and second session events to a pipeline for storage in a database.

15. The system of claim 14, wherein the batched first and second session events are stored in the database in a serialized format.

16. The system of claim 15, wherein accessing the session events comprises:

perform an unserialization with respect to the serialized format of the batched first and second session events stored in the database.

17. The system of claim 16, wherein unserializing the iframe includes wait for the iframe to be loaded before unserializing HTML elements as children with respect to the iframe.

18. A non-transitory computer-readable storage medium, the computer-readable storage medium including instructions that when executed by a computer, cause the computer to perform operations comprising:

accessing session events corresponding to user interaction by plural first devices with respect to a webpage, the session events comprising first session events associated with a first tracking tag corresponding to a main window of the webpage, the session events further comprising second session events associated with a second tracking tag corresponding to an iframe of the webpage;

determining, based on the first session events associated with the first tracking tag, first zoning information corresponding to the main window of the webpage;

determining, based on the second session events associated with the second tracking tag, second zoning information corresponding to the iframe of the webpage; and causing, based on the first and second zoning information, display of zoning metrics on a second device, wherein the first tracking tag is configured to send a first message to the second tracking tag, the first message comprising a unique identifier for the iframe, and wherein the second tracking tag is configured to send a second message to the first tracking tag, the second message comprising a discovery message to indicate when the second tracking tag is loaded.

19. The method of claim 1, wherein the first tracking tag sends the first message before the second tracking tag sends the second message, in a case where the first tracking tag is loaded before the second tracking tag is loaded.

20. The method of claim 1, wherein the second tracking tag sends the second message before the first tracking tag sends the first message, in a case where the second tracking tag is loaded before the first tracking tag is loaded.

* * * * *